(12) United States Patent
Betts et al.

(10) Patent No.: US 7,512,125 B2
(45) Date of Patent: Mar. 31, 2009

(54) CODING OF ROUTING PROTOCOL MESSAGES IN MARKUP LANGUAGE

(75) Inventors: Craig Betts, Kanata (CA); David Pochopsky, Ottawa (CA); Martin Barnes, Kanata (CA); Greg Bertin, Ottawa (CA); Wayne Burwell, Ottawa (CA)

(73) Assignee: Solace Systems, Inc., Ottawa, ON (CA)

( * ) Notice: Subject to any disclaimer, the term of this patent is extended or adjusted under 35 U.S.C. 154(b) by 697 days.

(21) Appl. No.: 11/012,097

(22) Filed: Dec. 16, 2004

(65) Prior Publication Data

US 2005/0195820 A1 Sep. 8, 2005

Related U.S. Application Data

(60) Provisional application No. 60/530,675, filed on Dec. 19, 2003.

(51) Int. Cl.
*H04L 12/28* (2006.01)
*H04L 12/56* (2006.01)
*H04J 1/14* (2006.01)
*H04J 3/12* (2006.01)
*G06F 15/16* (2006.01)

(52) U.S. Cl. .................. 370/392; 370/496; 370/524; 709/228

(58) Field of Classification Search ................. 370/389, 370/392, 496, 522, 524; 709/227–229
See application file for complete search history.

(56) References Cited

U.S. PATENT DOCUMENTS

| 6,021,443 | A | 2/2000 | Bracho et al. |
|---|---|---|---|
| 6,091,724 | A | 7/2000 | Chandra et al. |
| 6,782,380 | B1 * | 8/2004 | Thede ........................... 707/3 |
| 7,031,263 | B1 * | 4/2006 | Sun et al. ..................... 370/252 |
| 7,299,449 | B2 * | 11/2007 | Ruellan et al. ............... 717/116 |
| 7,386,318 | B2 * | 6/2008 | Moon et al. ............... 455/456.3 |
| 2002/0112058 | A1 * | 8/2002 | Weisman et al. ............ 709/227 |
| 2003/0099237 | A1 | 5/2003 | Mitra et al. |
| 2004/0002988 | A1 * | 1/2004 | Seshadri et al. ............. 707/102 |
| 2004/0010510 | A1 * | 1/2004 | Hotti ...................... 707/103 R |
| 2004/0215667 | A1 * | 10/2004 | Taylor et al. ................ 707/201 |

OTHER PUBLICATIONS

Carzaniga, A. et al. ; "A Routing Scheme for Content-Based Networking"; University of Colorado, Department of Computer Science Technical Report; Jun. 2003; Boulder, Colorado, U.S.A.
Arbouzov, L. et al.; "Extensible Markup Language (XML) 1.0 (Third Edition)"; Feb. 4, 2004; W3C.

(Continued)

*Primary Examiner*—Ronald Abelson
(74) *Attorney, Agent, or Firm*—Marks & Clerk; Richard J. Mitchell

(57) ABSTRACT

An implicit routing protocol for content-based networks having a plurality of XML routers includes an XML Link State Protocol and an XML Subscription Management Protocol that routes customer data based on XML content. The XML Link State Protocol and the XML Subscription Management Protocol includes several messages that must be exchanged between XML routers in the network. These messages are encoded using XML.

19 Claims, 10 Drawing Sheets

OTHER PUBLICATIONS

Arbouzov, L. et al.; "Extensible Markup Language (XML) 1.1"; Apr. 15, 2004; W3C.

"Namespaces in XML 1.1"; Feb. 4, 2004; W3C.

Oran, David; "OSI IS-IS Intra-Domain Routing Protocol"; Feb. 1990.

Callon, R.; "Use of OSI IS-IS for Routing in TCP/IP and Dual Environments"; Dec. 1990.

Moy, J.; "OSPF Version 2"; Apr. 1998; The Internet Society.

"Namespaces in XML"; World Wide Web Consortium; Jan. 14, 1999; W3C.

* cited by examiner

```
37
    <NaResponse version="1.0">
      <requestId val="1"/>
      <senderId val="ROUTER_ENDPOINT:HTTP:192.168.1.2:8080" mandatory="TRUE"/>
38    <isAccepted val="1" mandatory="TRUE"/>
      <priority val="3"/>
      <level val="1"/>
      <deadTime val="30"/>
    </NaResponse>
                                                                36
```

Fig. 5

```
<Lsp version="1.0">
  <requestId val="1"/>
  <senderId val="ROUTER_ENDPOINT:HTTP:192.168.1.2:8080" mandatory="TRUE"/>
  <sourceId val="ROUTER_ENDPOINT:HTTP:192.168.1.2:8080" mandatory="TRUE"/>
  <sequenceNumber val="3" mandatory="TRUE"/>
  <linkCosts/>
    <linkCost routerId="ROUTER_ENDPOINT:HTTP:192.168.1.3:8080" cost="1"/>
    <linkCost routerId="ROUTER_ENDPOINT:HTTP:192.168.1.4:8080" cost="1"/>
  </linkCosts>
</Lsp>
                                    39
```

Fig. 6

```
<LspResponse version="1.0">
  <requestId val="1"/>
  <senderId val="ROUTER_ENDPOINT:HTTP:192.168.1.3:8080" mandatory="TRUE"/>
  <sourceId val="ROUTER_ENDPOINT:HTTP:192.168.1.2:8080" mandatory="TRUE"/>
  <sequenceNumber val="3" mandatory="TRUE"/>
</LspResponse>
                                    40
```

Fig. 7

```
47 ─┐
    <Lsdd version="1.0">
      <requestId val="1"/>
42 ┐  <senderId val="ROUTER_ENDPOINT:HTTP:192.168.1.2:8080" mandatory="TRUE"/>
    └─<LinkStatePackets>
43 ┐  <Lsp>
    └─  <sourceId val=\" ROUTER_ENDPOINT:HTTP:192.168.1.2:8080" mandatory="TRUE"/>
44 ┐──<sequenceNumber val="3" mandatory="TRUE"/>
45 ┐──<linkCosts>
46 ──────<linkCost routerId="ROUTER_ENDPOINT:HTTP:192.168.1.3:8080" cost="1"/>
46 ──────<linkCost routerId="ROUTER_ENDPOINT:HTTP:192.168.1.4:8080" cost="1"/>
       </linkCosts>
     </Lsp>
43 ┐─<Lsp>
         <sourceId val="ROUTER_ENDPOINT:HTTP:192.168.1.4:8080" mandatory="TRUE"/>
         <sequenceNumber val="3" mandatory="TRUE"/>
         <linkCosts>
           <linkCost routerId="ROUTER_ENDPOINT:HTTP:192.168.1.5:8080" cost="1"/>
           <linkCost routerId="ROUTER_ENDPOINT:HTTP:192.168.1.6:8080" cost="1"/>
         </linkCosts>
       </Lsp>
     </LinkStatePackets >
   </Lsdd>
                                                    ── 41
```

Fig. 8

```
<LsddResponse version="1.0">
  <requestId val="1"/>
  <senderId val="ROUTER_ENDPOINT:HTTP:192.168.1.3:8080" mandatory="TRUE"/>
</LsddResponse>
                                  ── 50
```

Fig. 9

```
<HelloPacket version="1.0">
  <requestId val="1"/>
  <senderId val="ROUTER_ENDPOINT:HTTP:192.168.1.2:8080" mandatory="TRUE"/>
</HelloPacket
                              ── 51
```

Fig. 10

```
<HelloPacketResponse version="1.0">
  <requestId val="1"/>
  <senderId val="ROUTER_ENDPOINT:HTTP:192.168.1.3:8080" mandatory="TRUE"/>
</HelloPacketResponse>
```
— 52

Fig. 11

```
<RegisterXsmpNode version="1.0">
    <senderId val="ROUTER_ENDPOINT:HTTP:192.168.1.1:8080"/>
    <XsmpNodeList>
54 —<XsmpNodeInfo>
        <nodeId val="ROUTER_ENDPOINT:HTTP:192.168.1.1:8080"/>
      </XsmpNodeInfo>
54 —<XsmpNodeInfo>
        <nodeId val="ROUTER_ENDPOINT:HTTP:192.168.1.2:8080"/>
      </XsmpNodeInfo>
    </XsmpNodeList>
  </RegisterXsmpNode>
```
— 53

Fig. 12

```
<RegisterXsmpNodeResponse version="1.0">
  <senderId val="ROUTER_ENDPOINT:HTTP:192.168.1.2:8080" mandatory="TRUE">
  <isOk val="1" mandatory="TRUE"/>
</RegisterXsmpNodeResponse>
```
— 55

Fig. 13

```
<Xsdd version = "1.0">
  <senderId val="ROUTER_ENDPOINT:HTTP:192.168.1.1:8080" mandatory="TRUE"/>
  <XsddRows mandatory="TRUE">
    <XsdbRowDescription mandatory="TRUE">
      <nodeId val="ROUTER_ENDPOINT:HTTP:192.168.1.1:8080" mandatory="TRUE"/>
      <firstSeqNum val="23" mandatory="TRUE"/>
      <lastSeqNum val="44" mandatory="TRUE"/>
    </XsdbRowDescription>
    <XsdbRowDescription mandatory="TRUE">
      <nodeId val="ROUTER_ENDPOINT:HTTP:192.168.1.2:8080" mandatory="TRUE"/>
      <firstSeqNum val="1" mandatory="TRUE"/>
      <lastSeqNum val="2" mandatory="TRUE"/>
    </XsdbRowDescription>
  </XsddRows>
</Xsdd>
```

Fig. 14

```
<XsddResponse version="1.0">
  <senderId val="ROUTER_ENDPOINT:HTTP:192.168.1.2:8080" mandatory="TRUE"/>
  <isOk val="1" mandatory="TRUE"/>
</XsddResponse>
```

Fig. 15

```
<Xsr version="1.0">
  <senderId val="ROUTER_ENDPOINT:HTTP:192.168.1.1:8080" mandatory="TRUE"/>
  <reqNodeInfo val="0" mandatory="TRUE"/>
  <reqXsdd val="0" mandatory="TRUE"/>
  <requests mandatory="TRUE">
    <XsmpUpdateRequest mandatory="TRUE">
      <nodeId val="ROUTER_ENDPOINT:HTTP:192.168.1.2:8080" mandatory="TRUE"/>
      <firstSeqNum val="23" mandatory="TRUE"/>
      <lastSeqNum val="44" mandatory="TRUE"/>
    </XsmpUpdateRequest>
    <XsmpUpdateRequest mandatory="TRUE">
      <nodeId val="ROUTER_ENDPOINT:HTTP:192.168.1.3:8080" mandatory="TRUE"/>
      <firstSeqNum val="1" mandatory="TRUE"/>
      <lastSeqNum val="2" mandatory="TRUE"/>
    </XsmpUpdateRequest>
  </requests>
</Xsr>
```

Fig. 16

```
<XsrResponse version="1.0">
  <senderId val="ROUTER_ENDPOINT:HTTP:192.168.1.2:8080" mandatory="TRUE"/>
  <isOk val="1" mandatory="TRUE"/>
</XsrResponse >
```

Fig. 17

```
<SubscriptionUpdate version="1.0">
   <senderId val="ROUTER_ENDPOINT:HTTP:192.168.1.1:8080"/>
   <subscriberId val="ROUTER_ENDPOINT:HTTP:192.168.1.1:8080" mandatory="TRUE"/>
   <xsdbFirstSeqNum val="1" mandatory="TRUE"/>
   <xsdbLastSeqNum val="3" mandatory="TRUE"/>
   <PacketList mandatory="TRUE">
      <NamespacePacket>
         <addFlag val="1"/>
         <prefix val="pref1" mandatory="TRUE"/>
         <namespace val="www.pref1.com" mandatory="TRUE"/>
         <seqNum val="2" mandatory="TRUE"/>
         <prevSeqNum val="1" mandatory="TRUE"/>
      </NamespacePacket>
      <SubscriptionPacket>
         <addFlag val="1"/>
         <isFilter val="0"/>
         <subscription xpe="/pref1:x/y/z" mandatory="TRUE"/>
         <seqNum val="3" mandatory="TRUE"/>
         <prevSeqNum val="2" mandatory="TRUE"/>
      </SubscriptionPacket>
   </PacketList>
</SubscriptionUpdate>
```

63 — `<PacketList mandatory="TRUE">`
64 — `<NamespacePacket>`
66 — `<prefix val="pref1" mandatory="TRUE"/>`
67 — `<namespace val="www.pref1.com" mandatory="TRUE"/>`
65 — `<SubscriptionPacket>`
68 — `<subscription xpe="/pref1:x/y/z" mandatory="TRUE"/>`

```
<SubscriptionUpdate version="1.0">
   <senderId val="SUBSCRIBER_ENDPOINT:HTTP:192.168.1.1:8080"/>
   <subscriberId val="SUBSCRIBER_ENDPOINT:HTTP:192.168.1.1:8080" mandatory="TRUE"/>
   <PacketList mandatory="TRUE">
      <SubscriptionPacket mandatory="TRUE">
         <addFlag val="1"/>
         <isFilter val="0"/>
         <subscription xmlns:sol="www.sol.com" xmlns:google="www.google.com"
                       xpe="/sol:x/google:y" mandatory="TRUE"/>
      </SubscriptionPacket>
      <SubscriptionPacket mandatory="TRUE">
         <subscription xpe="/x/y/z" mandatory="TRUE"/>
      </SubscriptionPacket>
   </PacketList>
</SubscriptionUpdate>
```

71 — `<SubscriptionPacket mandatory="TRUE">`
72 — `<subscription xmlns:sol="www.sol.com" xmlns:google="www.google.com"`
73 — (namespace declarations)
74 — `xpe="/sol:x/google:y" mandatory="TRUE"/>`
75 — `<subscription xpe="/x/y/z" mandatory="TRUE"/>`
76 — `</SubscriptionPacket>`

```
<SubscriptionUpdateResponse version="1.0">
   <senderId val="ROUTER_ENDPOINT:HTTP:192.168.1.2:8080" mandatory="TRUE"/>
   <isOk val="1" mandatory="TRUE"/>
</SubscriptionUpdateResponse>
```
— 80

Fig. 20

```
<AddSubscriber version="1.0">
   <senderId val="SUBSCRIBER_ENDPOINT:HTTP:192.169.1.1:8080"/>
   <username val="guest"/>
   <password val="guest"/>
   <address val=" HTTP:192.169.1.1:8080" mandatory="TRUE"/>
   <name val="Bob Smith" mandatory="TRUE"/>
</AddSubscriber >
```
— 81

Fig. 21

```
<AddSubscriberResponse version="1.0">
   <senderId val="ROUTER ENDPOINT:HTTP:192.168.1.2:8080" mandatory="TRUE"/>
   <isOk val="1" mandatory="TRUE"/>
</AddSubscriberResponse>
```
— 82

Fig. 22

```
<RemoveSubscriber version="1.0">
  <senderId val=" SUBSCRIBER_ENDPOINT:HTTP:192.169.1.1:8080"/>
  <username val="guest"/>
  <password val="guest"/>
  <subscriberId val="SUBSCRIBER_ENDPOINT:HTTP:192.169.1.1:8080" mandatory="TRUE"/>
</RemoveSubscriber>
```
— 83

Fig. 23

```
<RemoveSubscriberResponse version="1.0">
  <senderId val="ROUTER_ENDPOINT:HTTP:192.168.1.2:8080" mandatory="TRUE"/>
  <isOk val="1" mandatory="TRUE"/>
</RemoveSubscriberResponse>
```
— 84

Fig. 24

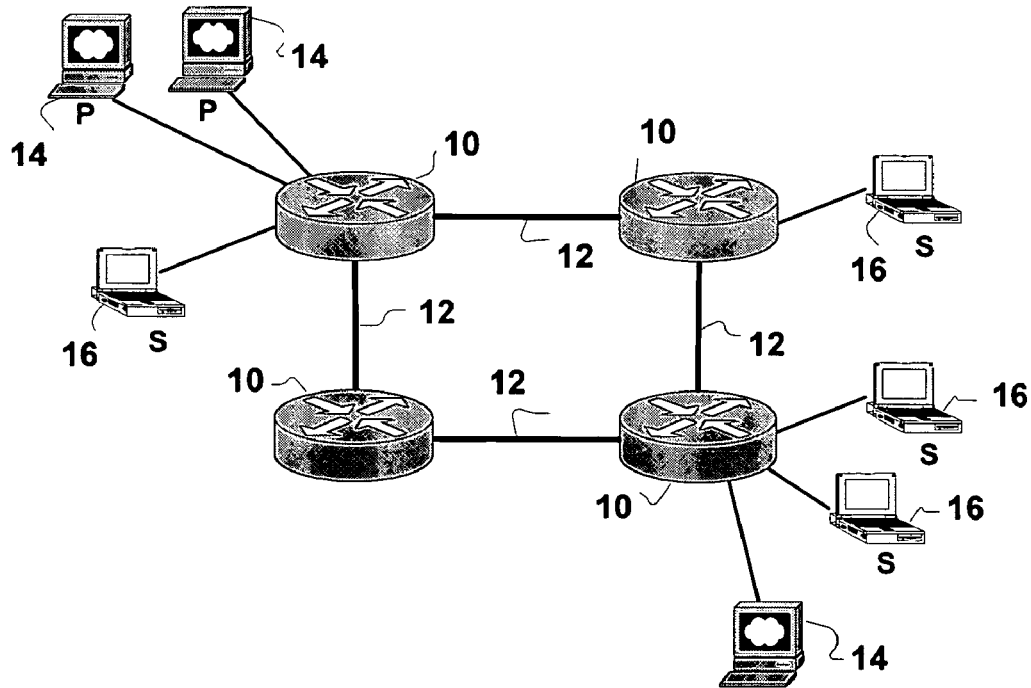

Fig. 25

CODING OF ROUTING PROTOCOL MESSAGES IN MARKUP LANGUAGE

CROSS REFERENCE TO RELATED APPLICATION

This application claims the benefit under 35 USC 119(e) of prior U.S. provisional application Ser. No. 60/530,675 filed Dec. 19, 2003, the contents of which are herein incorporated by reference.

FIELD OF THE INVENTION

This invention relates to content-based networks, and in particular a method coding of routing protocol messages in such networks using a markup language, such as XML.

BACKGROUND OF THE INVENTION

A routing scheme for content-based networks is described in the paper by A. Carzaniga, M. J. Rutherford, A. L. Wolf, A routing scheme for content-based networking, Department of Computer Science, University of Colorado, June 2003, the contents of which are herein incorporated by reference.

In traditional control plane protocols, such as routing protocols or signaling protocols, messages are typically encoded in a raw binary format. That is, a message is defined as a sequence of fields with pre-defined and fixed sizes. Locating a given field in the message is simply a matter of reading data from a fixed offset. The semantics of a field are known in advance to be either numeric (hexadecimal) data, string or an enumerated value.

An example of a prior-art routing protocol utilizing pre-defined fields with fixed sizes is OSPF Version 2, as defined by RFC 2328, "OSPF Version 2", April 1998, The Internet Society. An example of a routing message from OSPF is shown in FIG. 1. In this encoding format, the example routing message 1 is made up of a number of pre-defined, fixed size fields. For example, the packet type 2 is determined by the second field, where a value of 1 indicates a hello packet. The size of a given field cannot grow without changing the version number 3, which affects backwards compatibility. Moreover, new fields cannot be added, since the hello message has a variable sized list of neighbors 4 (i.e. repeated neighbor fields) at the end of the message. The Packet length 5 is used to determine how many neighbor entries are present.

More recently defined protocols often make use of a more flexible encoding, known as Type-Length-Value (TLV). In these schemes, each message consists of a series of data elements, and each element contains a "type"(which identifies both the field and semantics of the data), a "size" specified in bytes (which allows more flexible parsing of a message, when the tag value is not known by the receiver), and a "value"(the actual data assigned being propagated by this element). FIG. 2 shows an example TLV encoding in the prior art. The type field 11 is 1 octet, and indicates the type of information being encoded. Other names for field 11 is tag or code. The length field 12 indicates the number of octets which appears in the value field 13. The length field 12 is one octet, and the value field 13 contains the number of octets indicated by the length field 12. An example of a routing protocol using TLV encoding is IS-IS, as defined by RFC 1142, "OSI IS-IS Intra-domain Routing Protocol", February 1990, the Internet Society.

An example IS-IS routing message utilizing TLVs is shown in FIG. 3, as per RFC 1195, "Use of OSI IS-IS for Routing in TCP/IP and Dual Environments", December 1990, the Internet Society. FIG. 3 shows an example routing message 15, which is a "Level 1 Partial Sequence Numbers PDU". In this message, the header portion 16 utilizes fixed field definitions similar to the OSPF example of FIG. 1. Field 17 indicates the number of octets in the header portion 16. Field 18 indicates the number of octets in the entire PDU, and the lengh of the variable length fields 19 is determined by field 18 less field 17. The variable length fields 19 is a sequence of TLV-encoded entries, with each entry using the format shown in FIG. 2. This method has similar limitations in the header portion, since fixed fields are utilized. However, the message is extensible through the use of variable length fields 19, using TLV encodings. If the entire message had been encoded with TLVs, including the header portion, then the message would have even further flexibility as described above.

A fundamental requirement of all networking protocols is that they must be extensible. That is, all protocols evolve, and new fields are added to messages or the size of existing fields is changed. Protocols with fixed message formats typically include a "version" field, which is modified to indicate a change in the protocol specification. There is, of course, a problem with backwards compatibility, as software implemented for a previous version of the protocol can not interpret the new message format.

Protocols utilizing TLV encoding are somewhat better suited to dealing with this; as the message parsing code can be designed to ignore "types" that it doesn't understand (i.e. new message fields), and cope with "lengths" that it does not expect (although in many cases this coping is limited, for example, if a software module is designed to expect a 16 bit integer for some value, and instead receives a 32 bit value, it would be forced to truncate, likely introducing a protocol error).

A common interoperability problem introduced by fixed or TLV formatted messages is caused by the different "endian-ness" of various system architectures. Protocols are typically defined as being in "big-endian" format, meaning the most significant bits and bytes are sent first on the network. However, a sloppy implementation of a protocol on a "little-endian" system may lead to the opposite behavior. Often in this case, encoding problems are not detected until two systems of different endian-ness are tested.

Another side effect of both the fixed or TLV formatted messages, is the increased difficulty of debugging network problems. Network sniffers are a common debugging tool, but much of the value of the network sniffer is it is built in protocol parser; that is, its ability to convert from binary messages to human readable form.

SUMMARY OF THE INVENTION

In a broad aspect the invention provides a method of controlling communication networks including a plurality of network elements, comprising encoding control plane protocol messages using a markup language; and transferring said encoded messages between said network elements.

In one embodiment the invention employs an Implicit Routing Protocol (IRP), which consists of the XML Link State Protocol (XLSP) and the XML Subscription Management Protocol (XSMP), which routes customer data based on Extensible Markup Language (XML) content. The IRP consists of several messages that must be exchanged between XML routers in the network. The encoding of those messages is accomplished using XML, which ensures that the protocols are forward extensible. The use of XML also ensures that future versions of the protocol can be made backwards compatible with previously deployed systems.

The definition of XML encoded routing/networking protocol messages allow ease of forward extensibility. Future backwards compatibility of the protocol can be provided by allowing versioning information, and easily implemented parsing rules to be defined.

XML encoding eliminates "endian-ness" concerns from the realm of the protocol implementation (both message formatting and parsing).

The invention also provides an implicit routing protocol for content-based networks including a plurality of XML routers, comprising an XML Link State Protocol and an XML Subscription Management Protocol that routes customer data based on XML content, said XML Subscription Management Protocol comprising IRP (Implicit Routing Protocol) messages that must be exchanged between XML routers in the network, and said messages being encoded using XML.

The invention also provides a content router for use in a content routed network, said router being configured to exchange control messages containing control information with other content routers in the network, and said router further being configured to encode said control information using a markup language.

BRIEF DESCRIPTION OF THE DRAWING

The invention will now be described in more detail, by way of example only, with reference to the accompanying drawings, in which:

FIG. 5 shows a Neighbor Acquisition Response Message;
FIG. 6 shows a Link State Packet Request Message;
FIG. 7 shows a Link State Packet Response Message;
FIG. 8 shows a Link State Database Description Request Message;
FIG. 9 shows a Link State Database Description Response Message;
FIG. 10 shows a Hello Packet Request Message;
FIG. 11 shows a Hello Packet Response Message;
FIG. 12 shows a Register XSMP Node Request Message;
FIG. 13 shows a Register XSMP Node Response Message;
FIG. 14 shows an XML Subscription Database Description Request Message;
FIG. 15 shows an XML Subscription Database Description Response Message;
FIG. 16 shows an XML Subscription Request Message;
FIG. 17 shows an XML Subscription Response Message;
FIG. 18 shows a Subscription Update Request Message (Router to Router);
FIG. 19 shows a Subscription Update Request Message (Subscriber to Router);
FIG. 20 shows a Subscription Update Response Message;
FIG. 21 shows an Add Subscriber Request Message;
FIG. 22 shows an Add Subscriber Response Message;
FIG. 23 shows a Remove Subscriber Request Message;
FIG. 24 shows a Remove Subscriber Response Message;
and
FIG. 25 is a diagram of a typical content routed network.

DETAILED DESCRIPTION OF THE PREFERRED EMBODIMENTS

The content routed network shown in FIG. 25 comprises content routers 100 interconnected by links 120. The network is connected to publishers 140 responsible for generating content, which is transferred to the subscribers 160 over the network. Control messages are exchanged between the network elements.

In accordance with embodiments of the invention the control messages are encoded using XML. A detailed explanation of XML can be found in "Extensible Markup Language (XML) 1.0 (Third Edition)", W3C Recommendation 4 Feb. 2004, W3C (World Wide Web consortium) and "Extensible Markup Language (XML) 1.1", W3C Recommendation 15 Apr. 2004, W3C, the contents of which are herein incorporated by reference. A description of IRP, including XLSP and XSMP, can be found in co-filed application Ser. No. 60/530,615, the contents of which are herein incorporated by reference.

The following general points describe how control messages between network elements are formatted in accordance with embodiments of the invention:

1. The first XML tag in each IRP message reflects the type of the message.
2. The first XML tag in each IRP message includes an attribute indicating the version of the protocol. Versions are specified in the format {"version=x.y"}, where both x and y are numeric characters. See below for rules on versioning.
3. The remaining elements nested within an IRP message represent the fields of a given protocol message. Each element may optionally be tagged with attributes which define the parsing and backwards compatibility rules for that field:
   a. {mandatory =TRUE |FALSE}
4. Optionally, some fields may be omitted from a message. This is accomplished simply by not including the XML element corresponding to that field. The rule for which fields may be omitted is specific to a given protocol and message. Handling by the receiver of omitted fields is described below.

The complete list of XLSP messages and associated XML tag name is shown in Table 1 below:

TABLE 1

XLSP Messages

| XLSP Message | Outermost XML Tag Name |
|---|---|
| Neighbor Acquisition Request | NaRequest |
| Neighbor Acquisition Response | NaReponse |
| Link State Packet Request | Lsp |
| Link State Packet Response | LspResponse |
| Link State Database Description Request | Lsdd |
| Link State Database Description Response | LsddResponse |
| Hello Packet Request | HelloPacket |
| Hello Packet Response | HelloPacketResponse |

Figure 1:
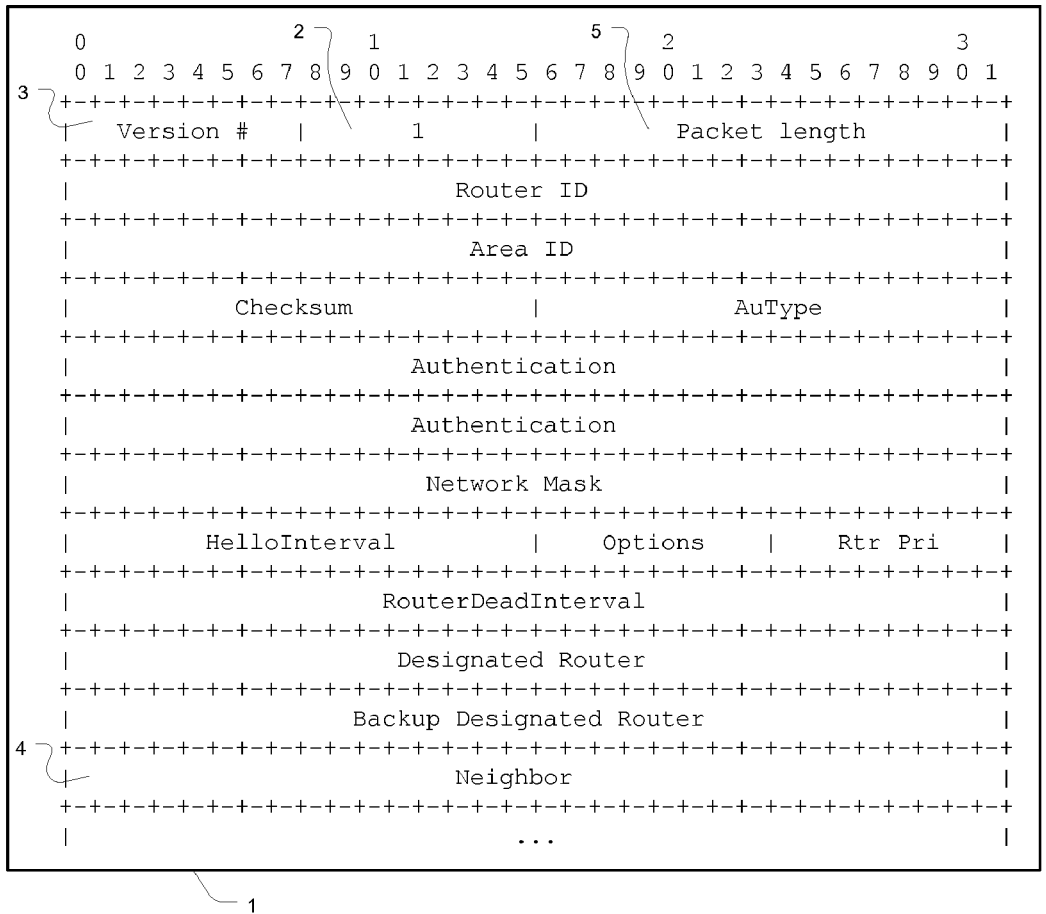
FIG. 1 shows an Example Prior Art Routing Message.
Figure 2:
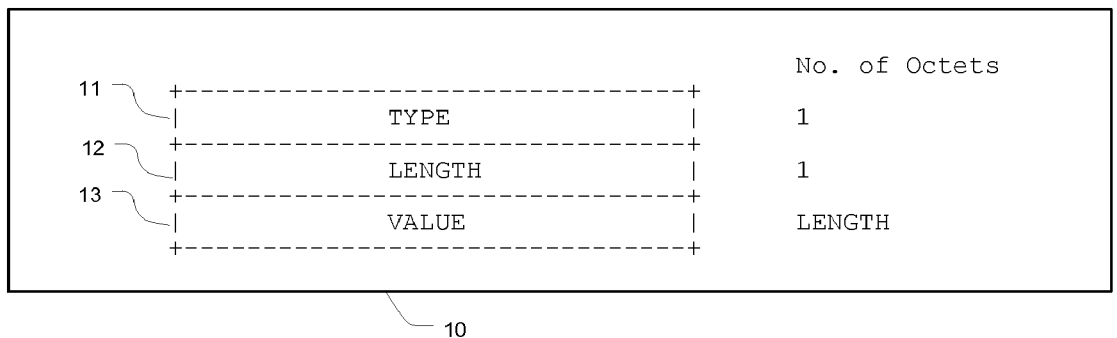
FIG. 2 shows an Example Prior Art TLV Encoding.
Figures 3, 4:
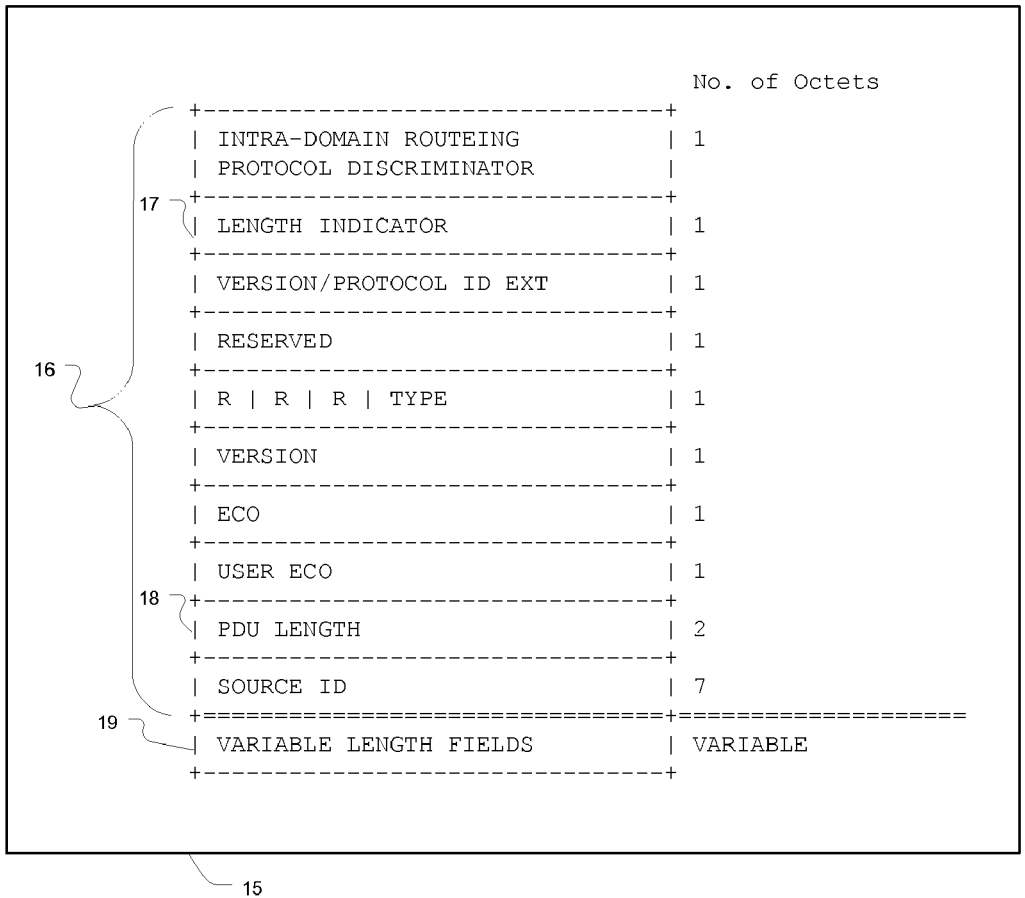
FIG. 3 shows an Example Prior Art Routing Message Using TLV.
FIG. 4 shows a Neighbor Acquisition Request Message.

FIG. 4 shows a sample Neighbor Acquisition Request Message 30. The outermost tag 31 in the XML message is the tag "NaRequest", which indicates the type of message as per Table 1 above. On the "NaRequest" element 31, the attribute "version" 32 indicates that this message has a version number of "1.0". Embedded elements, such as "senderId" 33, provide the contents of the NaRequest message 30. In the example element "senderId" 33, the value is indicated by the attribute "val" 34, with contents of "ROUTER_ENDPOINT:HTTP:192.168.1.1:8080". The senderId 33 also has an attribute "mandatory" 35 with a value of "TRUE", indicating that the "senderId" 33 is mandatory information. The components of the NaRequest message are shown in Table 2 below.

TABLE 2

NaRequest Message Components

| Tag | Attribute | Description | Mandatory? |
|---|---|---|---|
| NaRequest | | Message's abbreviated name | Yes |
| requestId | val | Sequential request identifier | No |
| senderId | val | The sending router's unique id | Yes |
| priority | val | The router's priority (1 high -> 4 low) | No |
| level | val | The tier level to which the router belongs | No |
| deadTime | val | The router's dead time | No |

FIG. 5 shows a sample Neighbor Acquisition Response Message 38. The outermost tag 37 is "NaResponse", which indicates that this message is a Neighbor Acquisition Response. The "isAccepted" element 36 indicates whether the sender of the response message accepted the Neighbor Acquisition Request message. In this example, "isAccepted" 36 indicates that the request was accepted, since the value is 1 (a value of 0 indicates rejection). The components of the NaResponse message are shown in Table 3 below.

TABLE 3

NaResponse Message Components

| Tag | Attribute | Description | Mandatory? |
|---|---|---|---|
| NaResponse | | Message's abbreviated name | Yes |
| requestId | val | The corresponding request's requestId | No |
| isAccepted | val | Boolean value indicating if the relationship has been accepted | Yes |
| senderId | val | The responding router's unique id | Yes |
| priority | val | The responding router's priority (1 high -> 4 low) | No |
| Level | val | The tier level to which the responding router belongs | No |
| deadTime | val | The responding router's dead time | No |

FIG. 6 shows a sample Link State Packet Request Message 39. The components of the Link State Packet Request Message 39 are shown in Table 4 below.

TABLE 4

Link State Packet Request Message Components

| Tag | Attribute(s) | Description | Mandatory? |
|---|---|---|---|
| Lsp | | Message's abbreviated name | Yes |
| RequestId | val | Sequential request identifier | No |
| senderId | val | The sending router's unique id | Yes |
| sourceId | val | The router's unique id for which the packet originated | Yes |
| sequenceNumber | val | The sequence number assigned to the LSP by the source, which is used to determine whether a received LSP is newer than an instance previously received. | Yes |
| linkCosts | | Tag indicating a list of zero or more link costs | No |
| linkCost | routerId, cost | The neighbouring router's unique id along with the link's cost | No |

FIG. 7 shows a sample Link State Packet Response Message 40, which is sent in response to a received Link State Packet Request Message. The components of the Link State Packet Response Message 40 are shown in Table 5 below.

TABLE 5

Link State Packet Response Message Components

| Tag | Attribute | Description | Mandatory? |
|---|---|---|---|
| LspResponse | | Message's abbreviated name | Yes |
| requestId | val | The corresponding request's requestId | No |
| senderId | val | The responding router's unique id | Yes |
| sourceId | val | The source router id as specified in the request | Yes |
| sequenceNumber | val | The corresponding request's sequence number | Yes |

FIG. 8 shows a sample Link State Database Description Request Message 41. Notice that this message contains many nested and repeated elements. XML encoding of routing messages allows any level of element nesting, repeated elements, etc. to be handled in a flexible and expandable manner. For example, the top-level tag "Lsdd" 47 contains a number of nested elements, such as "LinkStatePackets" 42. "LinkStatePackets" 42 itself contains a plurality of nested "Lsp" elements 43. The structure allows for any number of nested "Lsp" elements 43 to be present, which is required by the XLSP routing protocol. Within each "Lsp" element 43, there are further nested elements, such as "LinkCosts" 45. "LinkCosts" 45 itself has a plurality of nested "linkCost" elements 46. The nesting described above allows a given Link State Database Description Message 41 to contain a plurality of "Lsp" information 43, and each "Lsp" information 43 can contain a plurality of "linkCost" information 46. This allows the Link State Database Description Mesasge 41 to carry "Lsp" information about a number of XLSP nodes, and for each XLSP node, all the link information for that node can be carried. Using XML as an encoding scheme allows for complex data relationships to be easily modeled and exchanged between routers, as opposed to the prior art routing message encoding schemes of using fixed structures or TLV encodings. The components of the Link State Database Description Request Message 41 are shown in Table 5 below.

TABLE 6

Link State Database Description Request Message Components

| Tag | Attribute(s) | Description | Mandatory? |
|---|---|---|---|
| Lsdd | | Message's abbreviated name | Yes |
| requestId | val | Sequential request identifier | No |
| senderId | val | The sending router's unique id | Yes |
| LinkStatePackets | | Tag indicating a list of zero or more link state packets | No |
| Lsp | | Start tag for a link state packet (refer to Link State Packet Request in Table 4 above.) | No |

FIG. 9 shows a sample Link State Database Description Response Message 50, which is sent in response to a received Link State Database Description Request Message. The components of the Link State Database Description Response Message 50 are shown Table 7 below.

TABLE 7

Link State Database Description Response Message Components

| Tag | Attribute | Description | Mandatory? |
|---|---|---|---|
| LsddResponse | | Message's abbreviated name | Yes |
| requestId | val | The corresponding request's requestId | No |
| senderId | val | The responding router's unique id | Yes |

FIG. 10 shows a sample Hello Packet Request Message 51. The components of the Hello Packet Request Message 51 are shown in Table 8 below.

TABLE 8

Hello Packet Request Message Components

| Tag | Attribute(s) | Description | Mandatory? |
|---|---|---|---|
| HelloPacket | | Message's abbreviated name | Yes |
| requestId | val | Sequential request identifier | No |
| senderId | val | The sending router's unique id | Yes |

FIG. 11 shows a sample Hello Packet Response Message 52, which is sent in response to a Hello Packet Request Message. The components of the Hello Packet Response Message 52 are shown in Table 9 below.

TABLE 9

Hello Packet Response Message Components

| Tag | Attribute | Description | Mandatory? |
|---|---|---|---|
| HelloPacketResponse | | Message's abbreviated name | Yes |
| requestId | val | The corresponding request's requestId | No |
| senderId | val | The responding router's unique id | Yes |

The complete list of XSMP messages and associated XML tag name is shown in Table 10 below:

TABLE 10

XSMP Messages

| XSMP Message | Outermost XML Tag Name |
|---|---|
| Register XSMP Node Request | RegisterXsmpNode |
| Register XSMP Node Response | RegisterXsmpNodeResponse |
| XML Subscription Database Description Request | Xsdd |
| XML Subscription Database Description Response | XsddResponse |
| XML Subscription Request | Xsr |
| XML Subscription Response | XsrResponse |
| Subscription Update Request | SubscriptionUpdate |
| Subscription Update Response | SubscriptionUpdateResponse |
| Add Subscriber Request | AddSubscriber |
| Add Subscriber Response | AddSubscriberResponse |
| Remove Subscriber Request | RemoveSubscriber |
| Remove Subscriber Response | RemoveSubscriberResponse |

FIG. 12 shows a sample Register XSMP Node Request Message 53. Note the use of nested "XsmpNodeInfo" elements 54, which themselves contain nested elements. The components of the Register XSMP Node Request Message 53 are shown in Table 11 below.

TABLE 11

Register XSMP Node Request Message Components

| Tag | Attribute(s) | Description | Mandatory? |
|---|---|---|---|
| RegisterXsmpNode | | Message's abbreviated name | Yes |
| senderId | val | The sending endpoint's unique id | No |
| XsmpNodeList | | Indicate the beginning of a list of xsmp nodes | No |
| XsmpNodeInfo | | Start tag for information about an xsmp node | No |
| nodeId | val | The Xsmp node's unique id | No |

FIG. 13 shows a sample Register XSMP Node Response Message 55, which is sent in response to a received Register XSMP Node Request Message. The components of the Register XSMP Node Response Message 55 are shown in Table 12 below.

TABLE 12

Register XSMP Node Response Message Components

| Tag | Attribute(s) | Description | Mandatory? |
|---|---|---|---|
| RegisterXsmpNodeResponse | | Message's abbreviated name | Yes |
| senderId | val | The responding router's id | Yes |
| isOk | val | Boolean value indicating whether the registration was successful or not | Yes |

FIG. 14 shows a sample XML Subscription Database Description Request Message 56. Note the use of nested "XsdbRowDescription" elements 57, which themselves contain nested elements. The components of the XML Subscription Database Description Request Message 56 are shown in Table 13 below.

TABLE 13

XML Subscription Database Description Request Message Components

| Tag | Attribute(s) | Description | Mandatory? |
|---|---|---|---|
| Xsdd | | Message's abbreviated name | Yes |
| senderId | val | The sending router's id | Yes |
| XsddRows | | Tag indicates beginning of the list of row descriptions | Yes |
| XsdbRowDescription | | Tag indicates beginning of a row description | Yes |
| nodeId | val | The router id whose XML Subscription Database (XSDB) row is being described | Yes |
| firstSeqNum | val | The sequence number of the first message in XSDB | Yes |
| lastSeqNum | val | The sequence number of the last message in XSDB | Yes |

FIG. 15 shows a sample XML Subscription Database Description Response Message 58, which is sent in response to a received XML Subscription Database Description Request Message. The components of the XML Subscription Database Description Response Message 58 are shown in Table 14 below.

TABLE 14

XML Subscription Database Description
Response Message Components

| Tag | Attribute(s) | Description | Mandatory? |
|---|---|---|---|
| XsddResponse | | Message's abbreviated name | Yes |
| senderId | val | The responding router's id | Yes |
| isOk | val | Boolean value indicating whether the database description was processed successfully or not | Yes |

FIG. 16 shows a sample XML Subscription Request Message 59. Note the use of nested "XsmpUpdateRequest" elements 60, which themselves contain nested elements. The components of the XML Subscription Request Message 59 are shown in Table 15 below.

TABLE 15

XML Subscription Request Message

| Tag | Attribute(s) | Description | Mandatory? |
|---|---|---|---|
| Xsr | | Message's abbreviated name | Yes |
| senderId | val | The sending router's id | Yes |
| reqNodeInfo | val | Boolean flag indicating interest in node information | Yes |
| reqXsdd | val | Boolean flag indicating interest in a nodes XSDD | Yes |
| requests | | Tag indicates beginning of the list of requests | Yes |
| XsmpUpdateRequest | | Tag indicates beginning of a request | Yes |
| nodeId | val | The router id whose XSDB row is being requested | Yes |
| firstSeqNum | val | The sequence number of the first message being requested | Yes |
| lastSeqNum | val | The sequence number of the last message being requested | Yes |

FIG. 17 shows a sample XML Subscription Response Message 61, which is sent in response to a received XML Subscription Request Message. The components of the XML Subscription Response Message 61 are shown in Table 16 below.

TABLE 16

XML Subscription Response Message

| Tag | Attribute(s) | Description | Mandatory? |
|---|---|---|---|
| XsrResponse | | Message's abbreviated name | Yes |
| senderId | val | The responding router's id | Yes |
| isOk | val | Boolean value indicating whether the request was fulfilled successfully or not | Yes |

FIG. 18 shows a sample Subscription Update Request Message 62. Note that within the "PacketList" element 63, there can exist a plurality of "NameSpacePacket" elements 64 and a plurality of "SubscriptionPacket" elements 65. Within a "NamespacePacket" element 64, the "prefix" element 66 indicates a unique namespace prefix name, and the "namepace" element 67 indicates the namespace name that is assigned to the prefix. In this example, the prefix "pref1" defined in element 66 is mapped to the namespace "www.pref1.com" in element 67. Refer to "Namespaces in XML", W3C Recommendation 14 Jan. 1999, World Wide Web Consortium (W3C) and "Namespaces in XML 1.1", W3C Recommendation 4 Feb. 2004, World Wide Web Consortium (W3C). This allows prefixes to be assigned to namespaces for use in XPath expressions as part of subscriptions. In the "SubscriptionPacket" 65, the "subscription" element 68 contains an "xpe" attribute that defines the subscription string "/pref1:x/y/z". Note that "xpe" refers to "XPath Expression". Refer to "XML Path Language (XPath) Version 1.0", W3C Recommendation 16 Nov. 1999, World Wide Web Consortium (W3C). This subscription uses the previously defined prefix "pref1". This scheme allows the sending router to send a shared set of prefix definitions which can be used across a large set of subscriptions. The components of the Subscription Update Request Message 62 are shown in Table 17 below. This version of the message is used from one XML router to another XML router.

TABLE 17

Subscription Update Request Message (Router to Router)

| Tag | Attribute(s) | Description | Mandatory? |
|---|---|---|---|
| SubscriptionUpdate | | Message's abbreviated name | Yes |
| senderId | val | The sending router's id | No |
| subscriberId | val | The id of the router for which the update applies | Yes |
| xsdbFirstSeqNum | val | The sequence number of the first packet in the XSDB (XML Subscription Database) | Yes |
| xsdbLastSeqNum | val | The sequence number of the last packet in the XSDB | Yes |
| PacketList | | Tag indicates beginning of the list of update packets | Yes |
| NamespacePacket | | Tag indicates beginning of a namespace packet | No |
| addFlag | val | Boolean indicating whether to add (1) or remove (0) the namespace (default is 1). | No |
| prefix | val | The prefix to be associated with the following namespace | Yes |
| namespace | val | The namespace associated with the prefix | Yes |
| seqNum | val | The update packet's sequence number | Yes |
| prevSeqNum | val | The sequence number of the preceding update packet | Yes |
| SubscriptionPacket | | Tag indicates beginning of a subscription packet | No |
| addFlag | val | Boolean indicating whether to add (1) or remove (0) the namespace (default is 1). | No |
| isFilter | val | Boolean indicating whether subscription acts as a filter (never forward matches) or not (default is 0). Filters are never propagated between routers. | No |
| subscription | xpe | The subscription in the form of an XPath string | Yes |
| seqNum | val | The update packet's sequence number | Yes |
| prevSeqNum | val | The sequence number of the preceding update packet | Yes |

FIG. 19 shows a sample Subscription Update Request Message 70, which is used from a subscriber to an XML router (as opposed to the version above which is used between XML routers). This message can contain a plurality of SubscriptionPacket elements 71, each of which describes one subscription being updated (either added or removed). Within the SubscriptionPacket element 71, the subscription element 72 defines both XML namespaces 73 (of which there can be a plurality or none, and only relate to the subscription element 72) and an xpe 74. In the example subscription element 72, two namespaces have been defined (prefixes "sol" and "google") and used in the xpe 74. In the example subscription element 75, no namespaces have been defined as the xpe 76 does not use any. While the SubscriptionUpdate message 70 from a subscriber to an XML router does not use a separate definition of namespaces as in message 62 of FIG. 18, that technique could also be used in the messaging from subscribers if there is a number of namespace definitions that could be shared across a large number of subscriptions from a single subscriber. The components of the Subscription Update Request Message 70 used from subscribers to the router are shown in Table 18 below.

TABLE 18

Subscription Update Request Message (Subscriber to Router)

| Tag | Attribute(s) | Description | Mandatory? |
|---|---|---|---|
| SubscriptionUpdate | | Packets abbreviated name | Yes |
| senderId | val | The sending endpoint's unique id | No |
| subscriberId | val | The id of the subscriber for which the update applies | Yes |
| PacketList | | Tag indicates beginning of the list of update packets | Yes |
| SubscriptionPacket | | Tag indicates beginning of a subscription packet | Yes |
| addFlag | val | Boolean indicating whether to add (1) or remove (0) the subscription (default is 1). | No |
| isFilter | val | Boolean indicating whether subscription acts as a filter (never forward matches) or not (default is 0, i.e. not a filter) | No |
| subscription | Xpe, namespace definitions | The subscription in the form of an Xpath string with namespace definitions (if applicable) | Yes |

FIG. 20 shows a sample Subscription Update Response Message 80, which is sent in response to a received Subscription Update Request Message (from a router or a subscriber, i.e. a response to message 62 of FIG. 18 or message 70 of FIG. 19). The components of the Subscription Update Response Message 80 are shown in Table 19 below.

TABLE 19

Subscription Update Response Message

| Tag | Attribute(s) | Description | Mandatory? |
|---|---|---|---|
| SubscriptionUpdateResponse | | Message's abbreviated name | Yes |
| senderId | val | The responding router's id | Yes |
| isOk | val | Boolean value indicating whether the update packets were all processed successfully or not | Yes |

FIG. 21 shows a sample Add Subscriber Request Message 81. The components of the Add Subscriber Request Message 81 are shown in Table 20 below. This message is sent by subscribers of the XML router to the XML router.

TABLE 20

Add Subscriber Request Message

| Tag | Attribute(s) | Description | Mandatory? |
|---|---|---|---|
| AddSubscriber | | Message's abbreviated name | Yes |
| senderId | val | The sending endpoint's unique id | No |
| username | val | The new subscriber's username | No |
| password | val | The new subscriber's password | No |
| address | val | The new subscriber's network address | Yes |
| name | val | The new subscriber's name | Yes |

FIG. 22 shows a sample Add Subscriber Response Message 82. The components of the Add Subscriber Response Message 82 are shown in Table 21 below. This message is sent by the XML router back to a subscriber of the XML router in response to a received Add Subscriber Request Message.

TABLE 21

Add Subscriber Response Message

| Tag | Attribute(s) | Description | Mandatory? |
|---|---|---|---|
| AddSubscriberResponse | | Message's abbreviated name | Yes |
| senderId | val | The responding router's unique id | Yes |
| isOk | val | Boolean value indicating whether the new subscriber was created or not | Yes |

FIG. 23 shows a sample Remove Subscriber Request Message 83. The components of the Remove Subscriber Request Message 83 are shown in Table 22 below. This message is sent by subscribers of the XML router to the XML router.

TABLE 22

Remove Subscriber Request Message

| Tag | Attribute(s) | Description | Mandatory? |
|---|---|---|---|
| RemoveSubscriber | | Packets abbreviated name | Yes |
| senderId | val | The sending endpoint's unique id | No |
| username | val | The subscriber's username | No |
| password | val | The subscriber's password | No |
| subscriberId | val | The id of the subscriber to remove | Yes |

FIG. 24 shows a sample Remove Subscriber Response Message 84. The components of the Remove Subscriber Response Message 84 are shown in Table 23 below. This message is sent by the XML router back to a subscriber of the XML router in response to a received Remove Subscriber Request Message.

TABLE 23

Remove Subscriber Response Message

| Tag | Attribute(s) | Description | Mandatory? |
|---|---|---|---|
| RemoveSubscriberResponse | | Packets abbreviated name | Yes |
| senderId | val | The responding router's unique id | Yes |

TABLE 23-continued

Remove Subscriber Response Message

| Tag | Attribute(s) | Description | Mandatory? |
|---|---|---|---|
| isOk | val | Boolean value indicating whether the subscriber was deleted or not | Yes |

When parsing an IRP protocol message, the following rules must be implemented by the receiver to ensure backwards and forwards compatibility:

1. If the first (outermost) element (the message type) is not a recognized message for the protocol (XLSP or XSMP), the message is discarded. The mandatory attribute, if present on the outermost element, can be used to indicate whether the sender indicates this message is mandatory or not to support. Receipt of a non-understood mandatory message indicates a protocol error.
2. The {"version=x.y"} attribute must be present in the first element, and is compared to the protocols own internal version number, p.q, as follows:
   a. If x.y=p.q, then the protocol versions are the same (both the major version portion x and the minor version portion y).
   b. If x>p, then the received message is of a higher major version than that supported by the receiving node, indicating a non-backwards compatible change to the protocol. The receiver must discard the message, and preferentially produce a log or alarm to indicate that a version mismatch exists.
   c. If x<p, then the received message is of an older version number than what the node supports, but the major version number has been changed, indicating a major change to the protocol which is not backwards compatible. The receiver must discard the message, and preferentially produce a log or alarm to indicate that a version mismatch exists.
   d. if x=p and q>y, then the received message is older than the local implementation, and backwards compatibility rules exist for interpreting and handling the message.
   e. If x=p and y>q, then the received message is newer than the local implementation (but the major version numbers are the same), and the receiver will attempt to parse the message, obeying the rules given in the next two points.
3. If a received field is unknown by the receiver (that is, the XML element name is not recognized), handling of the message is dependent on the {"mandatory="} attribute:
   a. If the field contains a {"mandatory=FALSE"} attribute, or the {"mandatory"} attribute is omitted, then the receiver ignores the field, but parses the remainder of the message as normal.
   b. If the field contains a {"mandatory=TRUE"} attribute, then the receiver must discard the message.
4. If a particular message field is omitted by the sender, then the action of the receiver is defined by its internal {"mandatory"} attribute for that field (ie stored in an internal data dictionary).
   a. If the field is tagged as {"mandatory=FALSE"}, then the receiver assigns a suitable default value to the field.
   b. If the field is tagged as {"mandatory=TRUE"} attribute, then the receiver must discard the message.

It should be noted that in the example messages, the first element (the one that defines the message type, such as element 31 of FIG. 4) can also carry the mandatory attribute like any other element. This can indicate to the receiver whether it is a protocol error or not that this new message which is not understood is being discarded.

When a message is discarded, if the message was a request message that is understood by the receiver, then a response message can optionally be sent back indicating that the request message was rejected. The way in which this is done depends upon the exact syntax of the response message. For example, the response message may have an "isOk" tag to carry whether the request message was processed successfully or not.

Note that other encoding schemes of protocol messages are also possible using XML. For example, instead of the outermost XML element indicating the message type, an attribute can carry the message type. It will be appreciated by those skilled in the art that numerous XML encoding schemes can be used to achieve the same result. Also, namespaces could be used for some or all of the XML message tags, including the message type.

An exemplary embodiment of the invention has been described. It will be appreciated by persons skilled in the art that many variants are possible within the scope of the invention.

All references mentioned above are herein incorporated by reference. Reference has been made herein to copending provisional applications, which are incorporated by reference. Such incorporation by reference should also be taken to include the non-provisional applications based thereon whose serial numbers will be inserted when they become available.

We claim:

1. A method of controlling communication networks including a plurality of network elements, comprising:
   encoding control plane protocol messages using XML markup language; and
   transferring said encoded messages between said network elements,
   wherein said messages include a plurality of nested elements, and said nested elements include XML tags, attributes reflecting message type and version number, or a combination of XML tags and attributes reflecting message type and version number, and
   wherein said content router employs an XML link state protocol to manage links within the network and an XML subscription management protocol that routes customer data based on XML content, and said content router is configured to employ said control plane protocol messages as part of said link state protocol and said subscription management protocol.

2. The method of claim 1, wherein the outermost message nested element reflects message type.

3. The method of claim 1, wherein said nested message includes additional nested elements representing data fields.

4. The method of claim 3, wherein said additional nested elements are tagged with attributes defining rules associated with that particular field.

5. The method of claim 4, wherein said rules include parsing and backwards compatibility rules.

6. The method of claim 1, wherein a network element receiving an incoming message examines said incoming message to determine whether the message type is a recognized message, and if the incoming message is not recognized type discards the incoming message.

7. The method of claim 6, wherein said network element receiving an incoming message examines said incoming message to determine the version number, and if the incoming message has a version is incompatible with the receiving network element, said receiving network element discards the incoming message.

8. The method of claim 7, wherein said receiving network element generates a log or alarm in the event of a version mismatch.

9. A method of routing in content-based networks including a plurality of XML routers, comprising:
assembling routing messages for exchange between XML routers in the network;
encoding said messages using XML;
exchanging said coded messages between said routers,
wherein said messages comprise nested elements reflecting data fields, and
wherein said content router employs an XML link state protocol to manage links within the network and an XML subscription management protocol that routes customer data based on XML content, and said XML routers are configured to employ said messages as part of said link state protocol and said subscription management protocol.

10. The method of claim 9, wherein said messages include an XML element indicating protocol message type.

11. The method of claim 10, wherein said XML element indicating protocol message type is the outermost nested element.

12. The method of claim 11, wherein the outermost element includes an attribute indicating the version of a protocol employed in the message.

13. The method of claim 9, wherein each message element is tagged with attributes which define the parsing and backwards compatibility rules for that particular field.

14. A method of routing packets in a content-based network including a plurality of routers, comprising:
establishing an implicit routing protocol comprising an XML-based Link State Protocol that manages links within the content-based network, and an XML Subscription Management Protocol that routes customer data through said content-based network based on XML content; and
wherein said implicit routing protocol comprises exchanging messages encoded using XML between said plurality of routers,
wherein said messages include a plurality of nested elements, and said nested elements include XML tags, attributes reflecting message type and version number, or a combination of XML tags and attributes reflecting message type and version number, and
wherein said routers are configured to employ said messages as part of said link state protocol and said subscription management protocol.

15. A method as claimed in claim 14, wherein said IRP messages are enclosed within an XML element, and a first level element defines the message type.

16. A method as claimed in claim 15, wherein said first level elements each include an attribute indicating the version of the protocol.

17. A method as claimed in claim 16, wherein remaining elements nested within first level elements represent the fields of a given protocol message.

18. A method as claimed in claim 17, wherein each element is tagged with attributes which define the parsing and backwards compatibility rules for that particular field.

19. A content router for use in a content routed network, wherein said router is configured to exchange control messages containing control information with other content routers in the network, wherein said router is configured to encode said control information using XML markup language, wherein said messages comprise nested elements reflecting data fields, and wherein said content router employs an XML link state protocol to manage links within the network and an XML subscription management protocol that routes customer data based on XML content, said content router being configured to employ said control messages as part of said link state protocol and said subscription management protocol.

* * * * *